Figure 1:
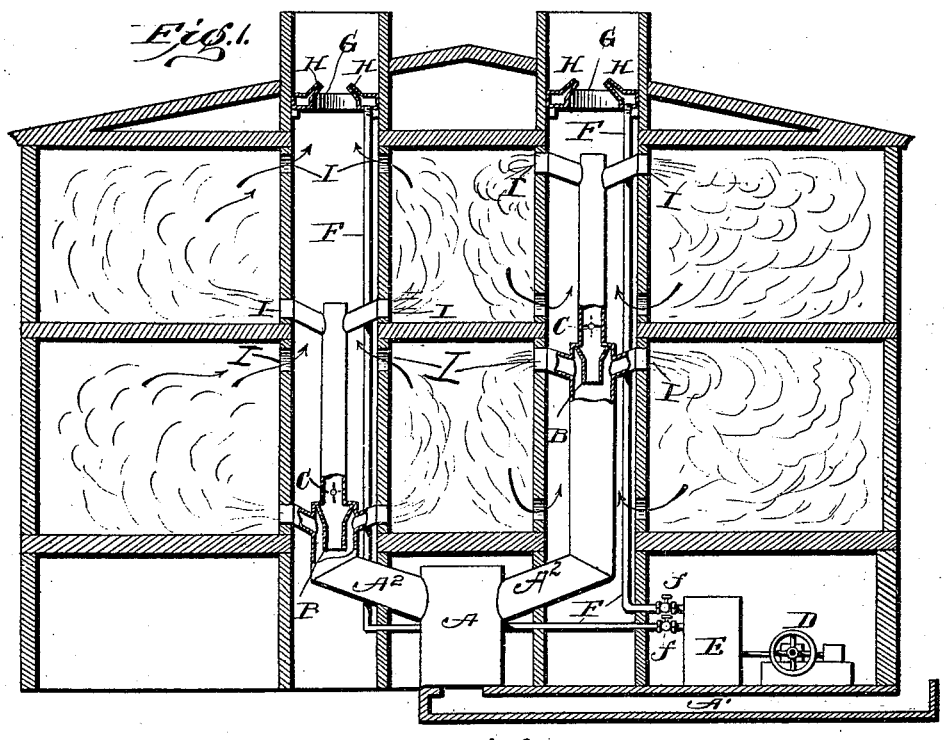

No. 690,252. Patented Dec. 31, 1901.
G. H. ENNIS.
HEATING AND VENTILATION OF BUILDINGS.
(Application filed Mar. 15, 1895.)
(No Model.) 2 Sheets—Sheet 1.

No. 690,252. Patented Dec. 31, 1901.
G. H. ENNIS.
HEATING AND VENTILATION OF BUILDINGS.
(Application filed Mar. 15, 1895.)
(No Model.) 2 Sheets—Sheet 2.

Witnesses:
J. M. Fowler Jr
Ralph S. Warfield

Inventor
George H. Ennis
by Rhesa D. Bois & Co.
Att'ys

UNITED STATES PATENT OFFICE.

GEORGE H. ENNIS, OF TROY, NEW YORK, ASSIGNOR TO JESSIE D. ENNIS, OF TROY, NEW YORK.

HEATING AND VENTILATION OF BUILDINGS.

SPECIFICATION forming part of Letters Patent No. 690,252, dated December 31, 1901.

Application filed March 15, 1895. Serial No. 541,945. (No model.)

*To all whom it may concern:*

Be it known that I, GEORGE H. ENNIS, a citizen of the United States, residing at Troy, in the county of Rensselaer and State of New York, have invented certain new and useful Improvements in Heating and Ventilation of Buildings; and I do hereby declare the following to be a full, clear, and exact description of the invention, such as will enable others skilled in the art to which it appertains to make and use the same.

My invention relates to certain new and useful improvements in the heating and ventilation of buildings and it is designed to afford facilities for governing and regulating with great uniformity the volume of the heated air supplied to the several rooms of a building and also to secure a thorough ventilation of said rooms while being supplied with the heated air and even when, as in the summer-time, the heating of the rooms is interrupted.

To this end the main characteristic feature of my invention consists, in so far as the simultaneous heating and ventilation of the room is concerned, in establishing within the building one or more ventilating wells or shafts of large capacity, having openings communicating with the several rooms and receiving the main distributing-pipes of large diameter, which proceed from a hot-air furnace, steam-radiating furnace, or hot-water-radiating furnace located at the lower part of the building, said main distributing-pipes being provided with lateral branches leading into the several rooms of the building. By virtue of this general arrangement the installation of the heating means is readily effected. They are conveniently accessible for removal or repairs and can be made of such large dimensions as to effectually convey the heated air, and at the same time the radiation of heat from the portions of the hot-air main which pass through the ventilating-shaft is made available for the production of an upward current of air in said shaft, and thereby an exhaust from the several rooms communicating with the shaft. In many cases this exhaust, due solely to the upward current of air in the ventilating-shaft produced by radiation from the hot-air main, will be sufficient for the ventilation desired; but in some instances in order to facilitate the ventilation and in order to compensate for a sluggish ascent of heated air into the rooms to be heated I provide within the ventilator-shaft a compressed-air-jet apparatus having nozzles directed upwardly and preferably in the form of a hollow annulus, from which said jet-nozzles project, said annulus being connected by a supply-conduit with the equalizing-reservoir of a compressed-air pump, whereby jets of compressed air are projected upwardly within the ventilating-shaft, so as to exhaust the air from the rooms communicating with said shaft and to cause a correspondingly-increased inflow of heated air into the several rooms in addition to the supply of heated air thereto due merely to the usual draft of the ventilating-shaft. In order to increase the efficacy of the jet apparatus, I preferably convey the supply-pipe leading thereto through the ventilating-shaft or through the hot-air main, so that the compressed air on its way to the jet-nozzles may be heated and correspondingly expanded, so as to add to its ejecting capacity. When the heating-furnace is not in operation during warm weather, the compressed-air-jet apparatus may be employed for the purpose solely of ventilating the several rooms.

In order to control the distribution of the heated air to the rooms of the several stories of the building in such manner as to secure a substantially equal distribution thereof, I construct the main distributing-pipe in sections, each section corresponding to one story of the building and each upper section being of smaller diameter than the section immediately below it. Furthermore, each lower section is provided at its point of juncture with the section immediately above it with an inner choke-pipe, leaving an annular space or choke-pocket from which the lateral distributing branches of the hot-air main lead into the corresponding room to be heated.

I have illustrated the preferred embodiment of my improvements in the construction shown in the accompanying drawings, wherein—

Figure 2:
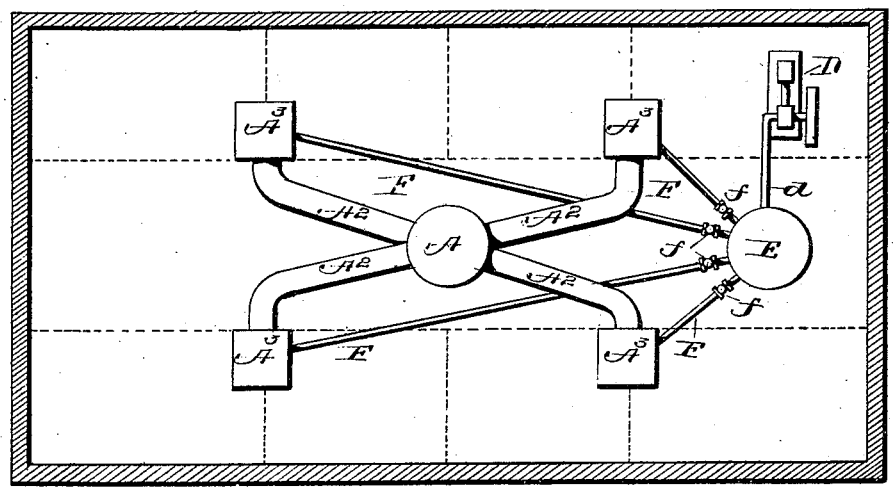
Figure 3:
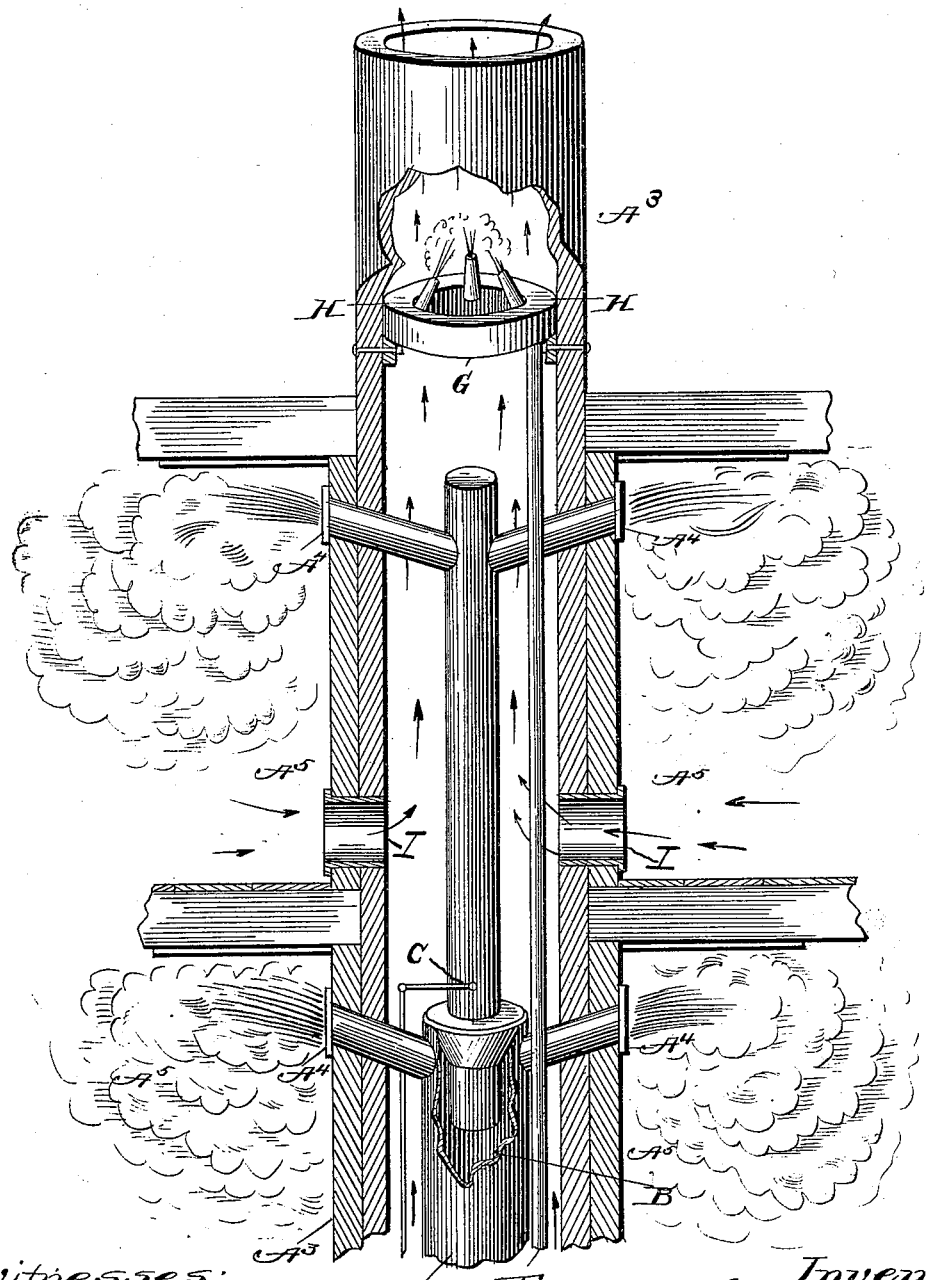

Figure 1 represents a vertical section of a building constructed in accordance with my invention and provided with the appurtenances making up my improved system. Fig. 2 represents a horizontal section of the building and shows in plan the relative arrangement of the parts of the system. Fig. 3 represents, partly in section and partly in elevation, a portion of a building with its ventilating-shaft and distributing-pipes constructed in accordance with my invention.

Similar letters of reference indicate similar parts throughout the several views.

Referring to the drawings, A represents a hot-air furnace or other suitable form of heat-radiating apparatus—as, for instance, steam-coils or hot-water coils suitably supplied.

A' is the conduit for supplying cold air to the hot-air furnace or other heat-radiating apparatus, and $A^2$ represents the mains for carrying the heated air to the desired points of distribution.

$A^3$ represents the ventilating shafts or wells, which extend from the lower interior of the building to the upper exit. The hot-air-distributing mains are inclosed by the ventilating-shafts, which are considerably larger than the hot-air mains and extend from the lower to the upper part of the building. The hot-air mains are each provided with lateral branches $A^4$, leading therefrom to the desired points of distribution, as to the separate rooms $A^5$, and have valves or dampers to control the distribution of the heated air. The heating-mains $A^2$ are made up of sections, the lowest section being the largest and the sections successively diminishing in size to the upper ends of the mains, which are closed.

The number and dimensions of the ventilating-shafts and the inclosed heating-mains will be determined by the number of rooms to be heated and ventilated. As shown at $A^3$ in Fig. 3, the ventilating-shaft is preferably of cylindrical shape and is made of brick. At the upper end of the first section of the heat-distributing main $A^2$ is located the interior funnel-shaped choke-pipe B, between which and the interior wall of said section is constituted a choke-pocket, from which proceed the lateral heat-radiating pipes $A^4$. These spaces, which I term "choke-pockets," arrest the currents of hot air in their ascent and deflect portions of the air into the distributing branches. In the upper section of the heat-distributing main is the valve or damper C, controllable by a lever and cord, as shown, either at the will of the engineer or automatically in any suitable manner—as, for instance, by any well-known automatic electrothermic apparatus.

The illustration chosen shows a building provided with but two stories; but it is evident that the system may be applied to buildings of many more stories. In my improved system the distribution of heat by large mains instead of by individual smaller pipes each extending from the source of heat to its particular point of distribution lessens the expense of piping and also admits of close regulation, either by closing the dampers by hand or by automatic apparatus, as hereinbefore referred to.

In order to supplement the exhaust effect due to the heating of the air in the ventilating-shaft and to remove the heated air from the mains more rapidly when desired, I provide an automatic air-compressing engine D, adapted to supply the equalizing-reservoir E with a volume of compressed air, pumped into the latter by the engine D and maintained therein at a constant pressure. Pipes F convey this compressed air to the hollow pneumatic rings G, from which it escapes through the nozzles H in the form of jets into the upper open space of the ventilating-shafts, thus causing an upward movement of the whole body of air and an exhaust through the openings I into the ventilating-shaft $A^3$ from the several rooms $A^5$ in addition to the usual draft therethrough caused by the presence of the hot-air mains within the shaft.

The number of the jets H and the angle at which they are set relative to the plane of the pneumatic ring may be varied, and the number of pneumatic rings may also be increased, as desired. The pipes F have valves $f$ to regulate the pressure of compressed air escaping from the jets H, and consequently the degree of exhaust in the ventilating-flues $A^3$. By reason of the fact that the pipes F pass through the ventilating-shaft the compressed air is heated and expanded by the heat radiated from the hot-air mains and the ejecting force of the jets is correspondingly increased.

It will of course be understood that when, as in summer, it is not desired to heat the rooms the heater A will be out of operation and the exhaust action of the compressed-air-jet apparatus will be made available merely for ventilating purposes.

I may say, further, with respect to my invention that it is designed to supersede to advantage those systems wherein fans or blowers are employed to force air over heated radiating-surfaces and through metal pipes for heating purposes. Such systems are open to the objection that being run at a high speed to secure efficiency they create considerable noise, due to the beating of the air by the fan-arms, which noise is conducted by the circulating air and the metal pipes into the rooms to be heated or ventilated to the annoyance of the occupants. If used as exhausters, such fans are oftentimes difficult to reach with power and require extra care in supervision, journal lubrication, &c., which objections are remedied, but to a limited extent, by the use of electric fans. My invention obviates these objections and furnishes a system cheaper, more effective, and easily controlled.

The pneumatic ring G is represented in the drawings as cylindrical in shape; but my invention is not confined to this shape, as in the case of a square ventilating-shaft the out-side periphery of the ring would be square to conform to the shape of the shaft and the center portion of the ring would be cylindrical. Neither do I confine myself to the funnel-shaped choke-pipe in the main hot-air feeder, although that construction is well adapted to the purpose; but similar constructions may be used of such character as to form a pocket to hold and retain the heated air and prevent its too rapid distribution.

Having thus described my invention, what I claim is—

1. In a heating and ventilating system, the combination with a suitable heater, of heat-distributing flues leading therefrom to the compartments to be heated, a flue-shaft surrounding the flues and having ventilating-openings in its side communicating with the interior of said compartments and being open at the top, whereby vitiated atmosphere is allowed to pass from the compartments into the shaft and be carried off, branch flues leading from the heating-flues into the compartments at points above the ventilating-openings, choke-pockets disposed in the flues at the junction of the branch pipes, and means for forcing an updraft in the flue-shaft, substantially as described.

2. The combination with a hot-air main, made up of sections successively diminishing in size from the largest section upward; of choke-pockets located at the junction of contiguous sections; distributing branches leading from the choke-pockets; a radiating-chamber connected with the lowest section; and an air-supply conduit leading into such chamber; substantially as described.

3. In a heating and ventilating system, the combination with an upwardly-leading ventilating-shaft; of a hot-air-feeder main inclosed by said shaft and closed at its upper end, said main being made up of sections successively diminishing in size from the lowest section; choke-pockets located at the points of junction of successive sections; distributing branches leading from the several sections into the inclosures to be heated; a heating-chamber connected with the lowest section; an air-supply conduit leading into such chamber; and exhaust-passages leading from the respective inclosures into the ventilating-shaft; substantially as described.

4. In a heating and ventilating system, the combination with an upwardly-leading ventilating-shaft; of a hot-air-feeder main inclosed by said shaft and closed at its upper end, said main being made up of sections successively diminishing in size from the lowest section; choke-pockets located at the points of junction of successive sections; distributing branches leading from the several sections into the inclosures to be heated; a heating-chamber connected with the lowest section; an air-supply conduit leading into such chamber; exhaust-passages leading from the respective inclosures into the ventilating-shaft; a hollow casing having jet-nozzles on its upper surface, the latter communicating with the interior of said casing; a supply-pipe of compressed air; valves for controlling the flow of said compressed air; a reservoir of compressed air; and an air-compressing engine; substantially as described.

In testimony whereof I affix my signature in presence of two witnesses.

GEORGE H. ENNIS.

Witnesses:
 JESSIE D. ENNIS,
 WILLIAM J. DYKES.